Sept. 14, 1943.  J. FLAWS, JR  2,329,599
MOUNT TESTING DEVICE
Filed Feb. 3, 1943   2 Sheets-Sheet 1
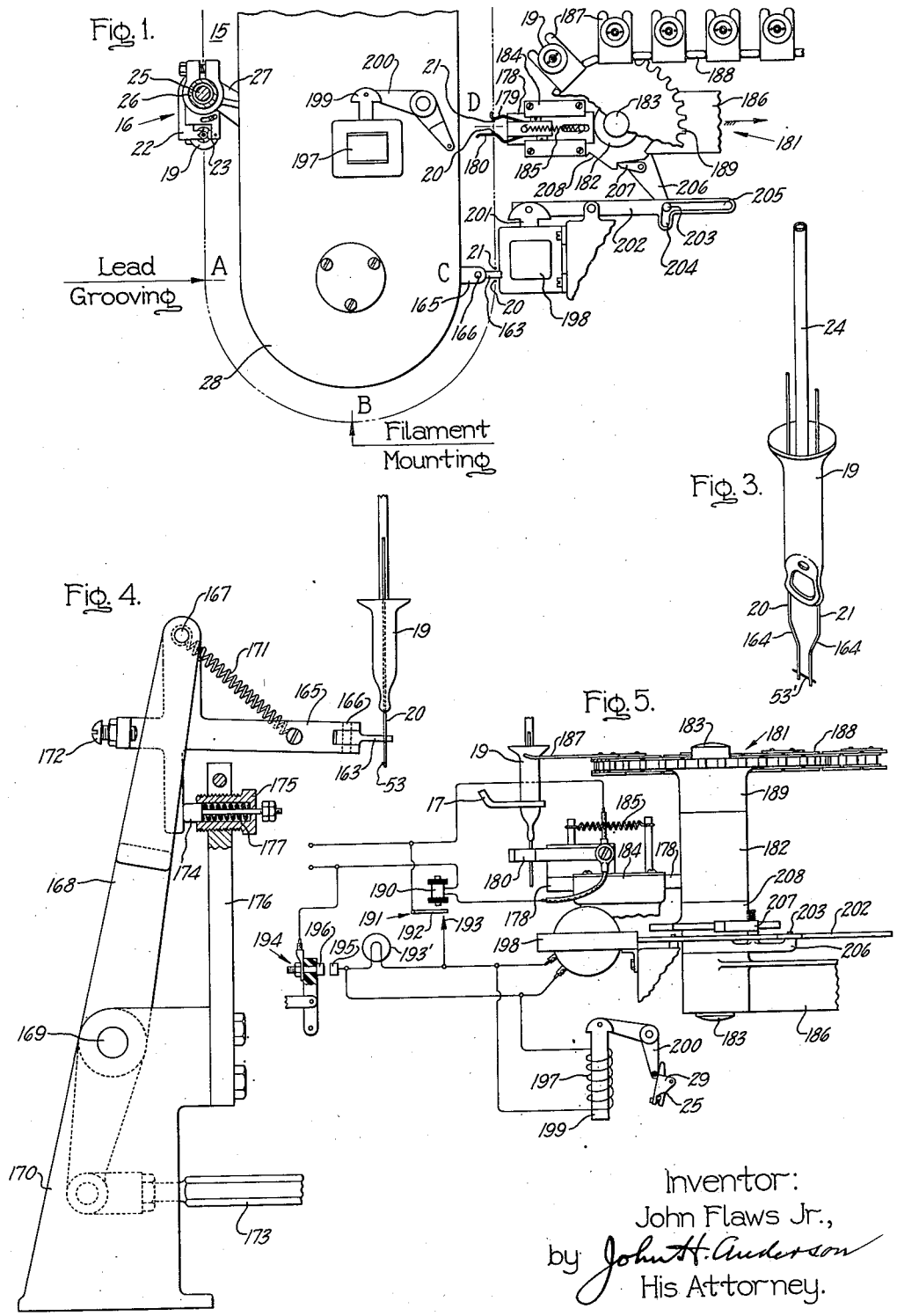

Sept. 14, 1943.　　J. FLAWS, JR　　2,329,599
MOUNT TESTING DEVICE
Filed Feb. 3, 1943　　2 Sheets-Sheet 2
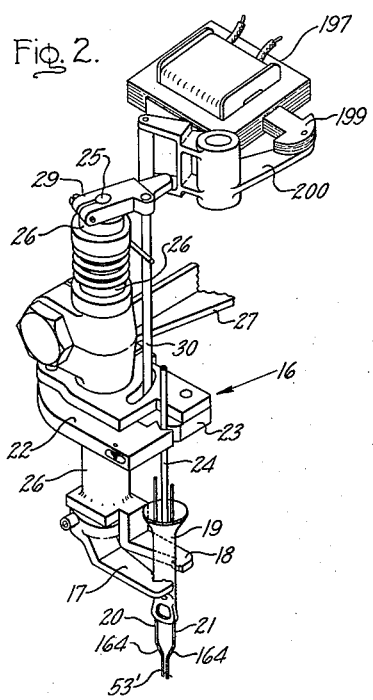
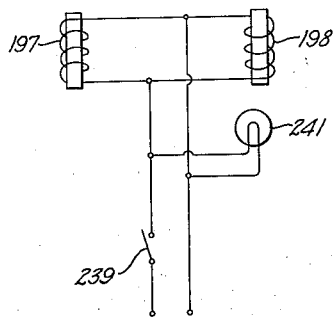
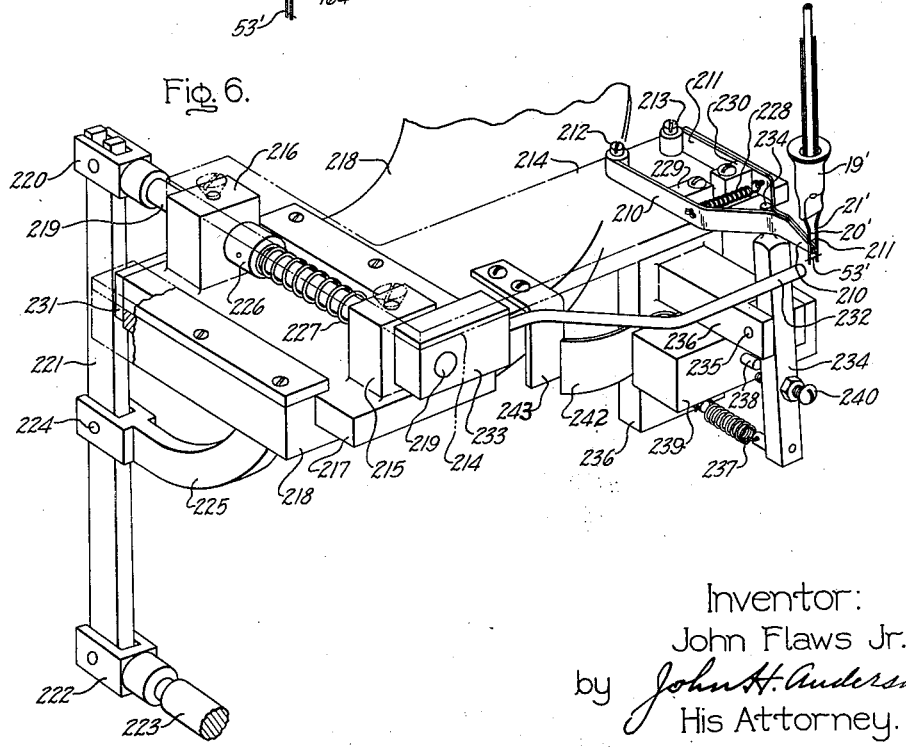
Inventor:
John Flaws Jr.,
by John H. Anderson
His Attorney.

Patented Sept. 14, 1943

2,329,599

UNITED STATES PATENT OFFICE 2,329,599

MOUNT TESTING DEVICE

John Flaws, Jr., East Cleveland, Ohio, assignor to General Electric Company, a corporation of New York Application February 3, 1943, Serial No. 474,574

17 Claims. (Cl. 176—3)

My invention relates to the mounting of filaments on the leads of a flash lamp, incandescent lamp, or similarly constructed electrical device. More particularly, my invention relates to apparatus for automatically testing mount assemblies after the filament has been attached to the leads to discover defectively manufactured assemblies and improper operation of the mounting apparatus.

This application is a continuation-in-part of my copending application Serial No. 420,474, filed November 26, 1941, which discloses and describes filament mounting apparatus in combination with which my test apparatus can be operated.

Owing to the very small size and length of filaments used in low voltage circuits and the need for providing filament-to-lead connections of uniformly low resistance, the operation of mounting such filaments has always been difficult and has required considerable skill and care. For these reasons in particular, one object of my invention is to provide apparatus for testing the connections between the filament and leads by attempting to pull one from the other. The test is a direct indication of the strength of the filament-to-lead connections and also is a very reliable indication of the proper operation of the mounting apparatus as loose or low strength connections are almost the only cause of high resistance connections.

Another object of my invention is to provide apparatus for indicating and removing from a filament mounting machine the lead and filament assemblies which have been defectively manufactured. This operation can be controlled by electrical energy passed through the assembly to ascertain whether said assembly has greater resistance than a satisfactory mount, after it is tested mechanically, or by the movement of the mechanical test means.

Still other objects and advantages of my invention will appear from the following detailed description of species thereof and from the accompanying drawings.

In the drawings, Fig. 1 is a plan view of the test apparatus of my invention and a portion of the carrier for advancing the stem holding the leads into operative relation to the filament mount apparatus at the stations indicated and thereafter to said test apparatus; Fig. 2 is a perspective view of a head of the carrier in combination with the means of opening said head at station D; Fig. 3 is a perspective view of a stem, and lead and filament assembly tested by my apparatus; Fig. 4 is a side elevation of the test apparatus at station C; Fig. 5 is a combination schematic drawing and wiring diagram of the filament mount testing and the control apparatus located at and adjacent station D; Fig. 6 is a perspective view of modified filament mount testing and control apparatus; and Fig. 7 is a wiring diagram of the electrical means of the modified apparatus.

The mounting and test operations taking place at the various stations A to D inclusive depend on the accurate placement of two spaced leads at each of said stations, an operation which is performed, in this particular instance, by an endless belt type carrier 15 (Fig. 1) having heads 16 at regularly spaced intervals. The carrier 15 shown is that disclosed in detail in my Patent 1,907,532 of May 9, 1933. Each head 16 of the carrier 15 comprises one pair of jaws 17 and 18 (Fig. 2) for gripping a stem 19 (Figs. 2 and 3) in which the leads 20 and 21 are sealed, and a second pair of jaws 22 and 23 for gripping the exhaust tube 24. The vertically disposed shaft 25 and the sleeve 26 surrounding it provide the means of holding the jaws 17—18 and 22—23 in proper relation and are in turn held in position by the bracket 27 which forms a link in the carrier 15 and which engages the central supporting and actuating means 28 (Fig. 1) thereof. The arm 29 on the upper end of the shaft 25 and the rod 30 which extends downwardly therefrom operate the jaws 17—18 and 22—23. As disclosed in my patent hereinbefore referred to, the carrier 15 is preferably one part of apparatus for assembling and forming the stem 19 and other apparatus for mounting a filament 53' on the leads 20 and 21, which apparatus is arranged so as to perform the various mounting operations at various stations taken by the stem 19 in the course of its movement.

The first step in the mounting of the filament on the leads 20 and 21 in apparatus of the type shown in my copending application, occurs at station A, where the lower ends of the leads 20 and 21 are trimmed to length and, while still held by the trimming means, are grooved or notched. The notches are made in the end portions of the leads 20 and 21 in a direction transverse thereto and are made in alignment with each other and to a depth substantially one-half the thickness of said leads so that end portions of the filament can be laid therein.

The succeeding indexing movement of the carrier 15 advances the head 16 to a station B and positions the leads 20 and 21 at a definite location with respect to the various sections of the mounting apparatus at this station. These sections of the mounting apparatus space the leads 20 and 21 a predetermined amount and, after bringing the filament 53' into mounting relation thereto with the end portions in the notches, squeeze the metal of said leads 20 and 21 over and around said portions to permanently attach said filament 53' thereto. Exceptionally good electrical and mechanical connections result between the filament 53' and the leads 20 and 21 by this method of operation.

The lead and filament assembly which in this particular instance forms a complete mount assembly is subjected to a test procedure which includes operations at both stations C and D in order that it and the operations of mounting apparatus can be checked. The first test operation, which takes place at station C, includes the placing of the filament-to-lead connections under tension in an attempt to separate the filament and the leads. Although this operation tests the mechanical strength of the filament-to-lead connections, it is also effective in discovering defective high-resistance connections, as nearly all such connections are loose or of low mechanical strength. The second test operation, which takes place at station D, includes the connection of the leads and filament in an electrical circuit and the testing of said circuit to discover if the mount assembly has the proper electrical resistance and is therefore properly made.

The improperly constructed mount assemblies which are all of higher than normal resistance are discharged from the heads 16 of the carrier 15 and are moved away from the mounting apparatus by a conveyor 181. Both test operations are dependent to a certain extent on each other, the first operation depending on the discovery and the discharge of partially defective mount assemblies which are rendered completely defective thereby, and the second operation depending on the discovery of certain defective mounts which could in certain specific instances pass said operation. The first test operation separates the filament from one of the leads when a filament-to-lead connection is insecure and allows the use of less sensitive apparatus for the second test operation if desired, as said apparatus need only discover if the circuit through the mount is complete. The first test operation also discovers certain filament-to-lead connections which have only slightly more than normal resistance and are difficult for the second test apparatus to discover.

The test operation occurring at station C is the result of an outward movement of the finger 163 (Figs. 1 and 4), which carries it between the leads 20 and 21 at a point near the stem 19, and a downward movement thereof, which forces it against the angular portions 164 (Fig. 3) of said leads 20 and 21. The finger 163 is, in effect, a part of arm 165, as it is pivotally mounted on the pin 166 in the arm which is, in turn, pivotally mounted on the pin 167 held by lever 168 and is actuated through the movements of said lever 168 about the pin 169 held by the standard 170.

At the start of the cycle of operation, the arm 165, which is biased by the spring 171 extending between the pin 167 and a post on said arm 165, is positioned with respect to lever 168 by the engagement of the stop screw 172 with the back edge thereof; and the movement of the lever 168 which is operated through the rod 173 by cam actuated means (not shown), a part of the mounting machine, causes a similar movement of the finger 163. The arm 165 remains in this position until the finger 163 is located between the leads 20 and 21 whereupon a portion of it engages the head of the stop pin 174 and the further movement of lever 168 causes the arm 165 to turn about the pin 167 and the finger 163 to swing down against the leads 20 and 21. The stop pin 174 is located within an opening in the sleeve 175 which is attached to the arm 176 extending from the standard 170 and serves as a stationary rest for the arm 165 until the pressure of the finger 163 increases to a predetermined value. After the pressure reaches this point, the stop pin 174 is pushed back in the sleeve 175 so as to compress the spring 177 and prevent any further increase in pressure on the leads 20 and 21 by permitting the arm 165 to turn about pin 167. The effect of this operation is to pry the leads 20 and 21 apart by pulling a lead from the filament if one of the connections thereto is not tight and secure. The test apparatus is particularly useful as it breaks the circuit from one lead to the other in instances where current can flow satisfactorily through said mount at the time it is manufactured but which will prove unsatisfactory when used.

Means are provided for changing the position of the sleeve 175 and the compression of the spring 177 to provide for the adjustment of the pressure exerted by the finger 163. The cycle of operations of this portion of the test apparatus is completed by the reverse movement of lever 168 which lifts finger 163 from the leads 20 and 21 and then swings it to one side of the mount.

The test operation taking place at station D starts with a movement of the slide 178 which carries the spring contacts 179—180 (Figs. 1 and 5) into engagement with the leads 20 and 21 and is produced by a corresponding movement of the conveyor 181 which causes the collar 182 on shaft 183 to butt against and push said slide 178. The slide 178 is normally located out of the path of movement of the mount (that is, to the right of the position in which it is shown in Figs. 1 and 5) in the ways in the stationary portion 184 of the machine and, in moving, causes the spring 185 (which extends between posts held by said slide 178 and the stationary portion 184 of the machine) to be stretched. A slot in the slide 178 prevents the spring post attached to the stationary portion 184 of the machine from interfering with the movements thereof.

The movement of the conveyor 181 is produced through cam actuated means (not shown), a part of the mounting machine, which engages the supporting bracket 186 for shaft 183 and, in moving said shaft 183, advances one of the holders 187 on the chain 188 engaging the sprocket 189 on the upper end of the shaft 183 to a position below the flange of the stem tube 19 of the mount assembly. The spring contacts 179 and 180, which are insulated from the slide 178, connect the leads 20 and 21 and the filament 53' in a circuit including the coil 190 of the relay 191 which is so proportioned and adjusted that the current conducted through an acceptable mount assembly causes the armature 192 of said relay 191 to be repositioned. If the mount assembly is not acceptable, that is if one of the lead-to-filament connections is imperfect or if the mount assembly is defective in any way effecting its electrical resistance, insufficient current passes through the relay 191 and the position of the armature 192 is not affected.

The relay 191 can be so accurately adjusted as to be actuated by mount assemblies having a lead-to-filament connection of only slightly more than normal resistance but need not be so adjusted in every instance as, ordinarily, the mount assemblies that are defective in this particular have the filament separated entirely from one of the leads 20 and 21 due to the operations of the apparatus at station C. Assuming that the present mount assembly is acceptable, the armature 192 of relay 191 is moved away from the contact 193 so that the electrical circuit controlled thereby is ineffective in causing operation of other portions of the apparatus and the conveyor 181 completes its cycle of operation by moving back away from the mount assembly which is then indexed from the station D. The mount assembly is therefore carried from station D by the regular indexing movements of the head 16 and is removed either manually or automatically from the mounting machine at a succeeding station.

If the mount assembly is not acceptable, another chain of operations occurs before the conveyor 181 is moved back from station D, which operations include the lighting of the indicator lamp 193' (Fig. 5) and the release of the mount assembly from the head 16 (Fig. 2) so that it drops into the holder 187 (Fig. 5) of the conveyor 181 and is moved back therewith. This chain of operations is started by the closing of the switch 194 comprised of the stationary and movable contacts 195 and 196, which are connected in a circuit including the armature 192 and contact 193 of the relay 191, the indicator lamp 193' and the solenoids 197 and 198 (Figs. 1 and 5). The said switch 194 is closed for an interval between each index of the head 16 by cam actuated means (not shown), a portion of the mounting machine. The continuous circuit formed when both relay 191 and switch 194 are closed causes solenoid 197 (Figs. 1, 2 and 3) to move its armature 199 so that the lever 200, which is located adjacent the upper extremity of the head, engages and turns the jaw release lever 29. This causes the jaws 17—18 and 22—23 to open and release the mount. The continuous circuit also causes solenoid 198 to move the armature 201, thereby turning the lever 202 so that the pin 203 is positioned in the offset portion 204 of the slot 205 in said lever 202.

The backward movement of the conveyor 181 occurs before the contacts 195 and 196 are separated and the lever 206 which holds the pin 203 is caused to turn about the shaft 183 so that the pawl 207 turns the ratchet wheel 208 attached to said shaft 183 causing the conveyor 181 to be indexed. In this way the holder 187 of said conveyor 181 receiving the defective mount assembly is indexed along and the next holder thereof is brought into position to receive a mount assembly. The contacts 195 and 196 are separated before the head 16 is indexed so that the apparatus is again subject to the test circuit established through a mount assembly in the next cycle of operation.

A modified form of mount assembly test apparatus which is shown in Fig. 6 provides a pair of fingers 210 and 211 adapted to pass between the leads 20' and 21' extending from a modified form of stem 19' and to spread apart so as to exert a pressure against said leads tending to separate them from the filament. In this combination a defective mount assembly is indicated by the extent to which the fingers 210 and 211 are permitted to spread which, in turn, is caused to complete the electrical circuit controlling the release of the stem 19' from the head 16 of the mounting apparatus and the index of the conveyor 181 effecting the removal of the dfeective mount assembly.

The fingers 210 and 211, which are pivotally mounted on the studs 212 and 213 respectively extending from the upper surface of the flat L-shaped bracket 214 (partially indicated in dot-dash lines in Fig. 6) are located to one side of the path of movement of the mount assembly and preferably at station D of the mounting apparatus described. The bracket 214 is fastened to the rectangular lugs 215 and 216 on the upper surface of the slide 217 which rests in the ways in arm 218 extending from a stationary part of the mounting apparatus (not shown) and is caused to carry the fingers 210 and 211 between the leads 20' and 21' and to operative relation thereto by movement of the slide 217 in said ways. This advancing movement of the fingers 210 and 211 is the result of a corresponding movement of the rod 219 which is connected through the yoke 220, lever 221, yoke 222 and rod 223 to cam controlled actuating means (not shown) similar to that shown in combination with the carrier and the parent mounting machine of my Patent 1,907,532 and which is slidably mounted in the lugs 215 and 216 of the slide 217. The movement includes the turning of the lever 221 about the pin 224 in the extending portion 225 of the stationary arm 218 and is transferred to the slide 217 through the collar 226, which is fastened to the rod 219, and the spring 227, which butts against the lug 215. During the interval the fingers 210 and 211 are being introduced between the leads 20' and 21', the contraction force of the spring 228, which extends between fastenings on each finger, keeps the fingers 210 and 211 against the blocks 229 and 230 on the top surface of the bracket 214 so that they are properly centered with the opening between the leads 20' and 21' and keeps the ends of said fingers 210 and 211 together so that they readily pass between said leads 20' and 21'. At the limit of the forward movement of the fingers 210 and 211, the heel plate 231 engages the back surface of the arm 218 and prevents further movement of the slide 217.

The succeeding spreading movement of the fingers 210 and 211 is produced by the still further movement of the rod 219 which carries the finger 232 on the block 233 on the forward end of said rod 219 away from the lever 234 so that the latter turns and the cylindrical end thereof is permitted to engage and force apart the juxtaposed converging surfaces of the fingers 210 and 211. The lever 234 which is pivoted on the pin 235 held by the lower portion 236 of the bracket 214 is under the constant pull of the contraction force of the spring 237 extending between posts in the lower end of said lever 234 and the lower portion 236 of the bracket 214 and causes the fingers 210 and 211 to engage and then exert a predetermined pressure against portions of said leads 20' and 21' adjacent the filament 53'. The pressure of the fingers 210 and 211 tends to spread the leads 20' and 21' apart but is limited by the contracting force of the spring 237 which is selected so that insufficient force is applied to break the filament 53' although sufficient force is provided to push a lead improperly attached to the filament 53' therefrom. The outward pressure of the fingers 210 and 211 does not bend the leads 20' and 21' of a properly made mount assembly.

If the filament assembly is properly manufactured, no further action takes place in the test apparatus until the rod 219 returns to its former position and in so doing moves the finger 232 and lever 234 back from the fingers 210 and 211 and the slide 217 and said fingers 210 and 211 back from the leads 20' and 21' of the stem 19'. However, should the filament assembly under test be so defective so that one of the leads 20' or 21' is pulled from the filament 53', one or both of said leads 20' and 21' are bent outward by the pressure thereon and the lever 234 advances farther between the fingers 210 and 211 and swings farther than usual. This additional movement of lever 234 carries its lower portion against the end of the control pin 238 of the fully enclosed switch 239 and pushes said pin 238 into the switch enclosure so that said switch 239 is closed and completes the circuit in which it is connected. At the limit of the movement of the lever 234 the stop screw 240 on the lower portion of the lever 234 engages the enclosure of the switch 239 which in this instance is a type R-RL-X switch manufactured by the Micro Switch Corporation of Freeport, Illinois. The lamp 241 (Fig. 7) is lighted by the completion of the circuit through the switch 239 so that an indication is given of defective condition of the stem 19' under test.

The present test apparatus also includes the previously described mechanism for opening the jaws of the heads 16 at station D and the conveyor 181 which has been moved so that one of the holders 187 is located about the stem 19' held by said head 16 at station D. As shown in the wiring diagram in Fig. 7, the switch 239 completes the electrical connection between the line and the solenoid 197 controlling the release of the stem 19' from the head 16 and solenoid 198 controlling the index movements of the conveyor 181. The release of the stem 19' effected by the solenoid 197 (Figs. 1 and 2) is brought about by the change in position of the armature 199 thereof which causes the lever 200 to engage jaw release lever 29 of the head 16 holding the mount assembly being tested and, as in the prior instance, permits the stem 19' to drop into the holder 187 of the conveyor 181 position adjacent thereto. The solenoid 198, on the other hand, as shown in the prior combination in Figs. 1 and 5, moves the lever 202 so that the pin 203 occupies the offset portion 204 thereof and causes the holder 187 carrying the stem 19' to be indexed along its course of movement in the conveyor 181 when said conveyor 181 moves back from operative relation to the head 16 at station D. These operations occur at the proper interval as the switch 239 remains closed without the pressure of the lever 234 against the pin 238 although the succeeding return movements of the apparatus carries the finger 232 against lever 234 causing it to swing back to its original position. The operations of the conveyor 181 correspond to those previously described in detail and advance an empty holder 187 on the chain 188 thereof into position to be carried into operative relation to the next succeeding head 16 advanced to station D. Before the heads 16 are indexed, however, the slide 217 moves back therefrom withdrawing the fingers 210 and 211 from between the leads 20' and 21' and moving the switch 239, which is attached to the portion 236 of the bracket 214 holding the pivot pin 235 for the lever 234, so that the spring finger 242 on the back of said switch 239 engages the stop 243 attached to the stationary arm 218. The switch 239 is caused to break the electrical circuit to the solenoids 197 and 198 by this action so that the head release means and conveyor indexing means return to their former position before another test operation and other operations of a succeeding cycle thereof begins.

Both forms of the test apparatus disclosed are particularly effective in the combination described, in that the filament 53' is very probably of extremely small size, .0006 to .001 inch diameter, for instance, and therefore of low strength, and in that the filament-to-lead connections of the mount assembly manufactured in this instance must have exceptionally good electrical conducting qualities. The test apparatus are also particularly well adapted to test mount assemblies having filament-to-lead connections of the type disclosed.

What I claim as new and desire to secure by Letters Patent of the United States is:

1. In a machine of the class described, the combination of a movable carrier having heads each adapted to hold a stem with a filament mounted on a pair of leads extending therefrom, means located along the path of movement thereof for testing a connection between the filament and lead by placing said connection under sufficient tension to separate the filament from the lead if said connection does not have the desired strength and means operable on separation of the filament from a lead providing an indication thereof.

2. In a machine of the class described, the combination of a movable carrier having heads each adapted to hold a stem with a filament mounted on a pair of leads extending therefrom, means located along the path of movement thereof for testing a connection between the filament and lead by placing said connection under sufficient tension to separate the filament from the lead if said connection does not have the desired strength and means operable on separation of the filament from a lead for effecting the release of the stem from the head to permit the discharge of said stem.

3. In a machine of the class described, the combination of a movable carrier having heads each adapted to hold a stem with a filament mounted on a pair of leads extending therefrom, means located along the path of movement thereof for testing a connection between the filament and lead by placing said connection under sufficient tension to separate the filament from the lead if said connection does not have the desired strength, a conveyor located along said path and means operable on separation of the filament from a lead for effecting the release of the stem from the head to permit the transfer thereof to the conveyor.

4. In a machine of the class described, the combination of a movable carrier having heads each adapted to hold a stem with a filament mounted on a pair of leads extending therefrom, means located along the path of movement thereof for testing the connections between the filament and leads comprising means introduced between the leads for applying pressure thereagainst tending to separate them so as to place said connections under sufficient tension to separate the filament from one of the leads if one of said connections does not have the desired strength, and means operable on the separation of the filament from a lead for effecting the release of the stem from the head to permit the discharge thereof.

5. In a machine of the class described, the combination of a movable carrier having heads each adapted to hold a stem with a filament mounted on a pair of leads extending therefrom, means located along the path of movement thereof for testing the connections between the filament and leads comprising a pair of fingers, means for advancing the fingers to a position between the leads and means for causing the fingers to engage the leads and exert pressure thereagainst tending to separate them so as to place said connections under sufficient tension to separate the filament from one of the leads if one of said connections does not have the desired strength, and means operable on separation of the leads and consequent greater movement of the fingers for effecting the release of the stem from the head to permit the discharge of the stem.

6. In a machine of the class described, the combination of a movable carrier having heads each adapted to hold a stem with a filament mounted on a pair of leads extending therefrom, means located along the path of movement thereof for testing the connections between the filament and leads comprising a pair of fingers, means for supporting and advancing said fingers to a position between the leads and means for causing the fingers to engage the leads and exert definite pressure thereagainst tending to separate them so as to place said connections under sufficient tension to separate the filament from one of the leads if one of said connections does not have the desired strength, means for releasing the stem from the head, a solenoid for effecting the actuation of said last-mentioned means and means operable with the greater movement of the fingers on separation of the leads for closing an electrical circuit to the solenoid to cause the stem to be released.

7. In a machine of the class described, the combination of a movable carrier having heads each adapted to hold a stem with a filament mounted on a pair of leads extending therefrom, means located along the path of movement thereof for testing the connections between the filament and leads comprising a pair of fingers having juxtaposed converging surfaces, means for supporting and advancing said fingers to a position between the leads, and a lever adapted to engage and apply a definite pressure against the converging surfaces of the fingers to cause said fingers to engage and exert pressure against the leads tending to separate them so as to place the connections under sufficient tension to separate the filament from one of the leads if one of said connections does not have the desired strength, and means operable with the greater movement of the lever on separation of the leads for effecting the release of the stem from the head to permit the discharge of the stem.

8. In a machine of the class described, the combination of a movable carrier having heads each adapted to hold a stem with a filament mounted on a pair of leads extending therefrom, means located along the path of movement thereof for testing a connection between the filament and lead by placing said connection under sufficient tension to separate the filament from the lead if said connection does not have the desired strength, means also located along said path for connecting a source of electrical energy to the leads, and means controlled by the passage of energy through the aforesaid means for indicating the separation of the filament from a lead.

9. In a machine of the class described, the combination of a movable carrier having heads each adapted to hold a stem with a filament mounted on a pair of leads extending therefrom, means located along the path of movement thereof for testing the connections between the filament and leads comprising means introduced between the leads for applying pressure thereagainst tending to separate them so as to place said connections under sufficient tension to separate the filament from one of the leads if one of said connections does not have the desired strength, means also located along said path for connecting a source of electrical energy to the leads, and means controlled by the passage of energy through the aforesaid means for indicating the separation of the filament from a lead.

10. In a machine of the class described, the combination of a movable carrier having heads each adapted to hold a stem with a filament mounted on a pair of leads extending therefrom, means located along the path of movement thereof for testing the connections between the filament and leads comprising a finger, stop means, and means for carrying said finger into position between said leads and thereafter against said stop means to cause it to engage said leads so as to apply pressure thereagainst tending to separate them and place said connections under sufficient tension to separate the filament from one of the leads if one of said connections does not have the desired strength, means also located along said path for connecting a source of electrical energy to the leads, and means controlled by the passage of energy through the aforesaid means for indicating the separation of the filament from a lead.

11. In a machine of the class described, the combination of a movable carrier having heads each adapted to hold a stem with a filament mounted on a pair of leads extending therefrom, means located along the path of movement thereof for testing a connection between the filament and lead by placing said connection under sufficient tension to separate the filament from the lead if said connection does not have the desired strength, means also located along said path for connecting a source of electrical energy to the leads, a conveyor located along said path, and means controlled by the passage of energy through the aforesaid means for effecting the transfer of the stem from the head to the conveyor when the circuit including the leads and filament is incomplete.

12. In a machine of the class described, the combination of a movable carrier having heads each adapted to hold a stem with a filament mounted on a pair of leads extending therefrom, means located along the path of movement thereof for connecting a source of electrical energy to the leads, and means controlled by the passage of energy through the aforesaid means for indicating defects in the circuit including the leads and filament affecting the resistance thereof.

13. In a machine of the class described, the combination of a movable carrier having heads each adapted to hold a stem with a filament mounted on a pair of leads extending therefrom, means located along the path of movement thereof for connecting a source of electrical energy to the leads, electrically actuated indicating means, and a relay controlling the operation of said indicating means and controlled by the passage of electrical energy through the aforesaid means for indicating defects in the circuit including the leads and filament affecting the resistance thereof.

14. In a machine of the class described, the combination of a movable carrier having heads each adapted to hold a stem with a filament mounted on a pair of leads extending therefrom, a pair of fingers located adjacent the path of movement thereof and connected to a source of electrical energy, means for moving said fingers to and from said path and into contact with the leads to connect portions of said leads and the filament to said source, and means controlled by the passage of energy through the aforesaid means for indicating defects in the circuit including the leads and filament affecting the resistance thereof.

15. In a machine of the class described, the combination of a movable carrier having heads each adapted to hold a stem with a filament mounted on a pair of leads extending therefrom, means located along the path of movement thereof for connecting a source of electrical energy to the leads, a conveyor located along said path and means controlled by the passage of energy through the aforesaid means for effecting the transfer of the stem from the head to the conveyor when defects in the circuit including the leads and the filament increase the resistance thereof above a predetermined value.

16. In a machine of the class described, the combination of a movable carrier having heads each adapted to hold a stem with a filament mounted on a pair of leads extending therefrom, means located along the path of movement thereof for connecting a source of electrical energy to the leads, a conveyor adapted to be moved to and from said path, means for releasing the stem from the head to permit it to enter the conveyor and means controlled by the passage of energy through the first mentioned means for effecting the operation of the last mentioned means when defects in the circuit including the leads and filament increase the resistance thereof above a predetermined value.

17. In a machine of the class described, the combination of a movable carrier having heads each adapted to hold a stem with a filament mounted on a pair of leads extending therefrom, means located along the path of movement thereof for connecting a source of electrical energy to the leads, a conveyor located adjacent said path having holders for a stem, means for moving a portion of said conveyor to carry a holder thereof to and from said path, means for releasing the stem from the head of the carrier to permit it to enter the holder of the conveyor, means for indexing the conveyor, and means controlled by the passage of energy through the first mentioned means for effecting the operation of stem releasing and conveyor indexing means when defects in the circuit including the leads and filament increase the resistance thereof above a predetermined value.

JOHN FLAWS, Jr.